(12) United States Patent
Meng et al.

(10) Patent No.: US 9,774,418 B2
(45) Date of Patent: Sep. 26, 2017

(54) METHOD AND SYSTEM FOR MANAGING MODULATION AND CODING SCHEME

(71) Applicant: ZTE CORPORATION, Shenzhen, Guangdong Province (CN)

(72) Inventors: Qingfeng Meng, Shenzhen (CN); Xi Yu, Shenzhen (CN); Zhuo Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 14 days.

(21) Appl. No.: 14/655,728

(22) PCT Filed: Sep. 9, 2013

(86) PCT No.: PCT/CN2013/083137
§ 371 (c)(1),
(2) Date: Jun. 26, 2015

(87) PCT Pub. No.: WO2014/101468
PCT Pub. Date: Jul. 3, 2014

(65) Prior Publication Data
US 2016/0218822 A1 Jul. 28, 2016

(30) Foreign Application Priority Data
Dec. 28, 2012 (CN) .......................... 2012 1 0586377

(51) Int. Cl.
*H04L 1/00* (2006.01)
(52) U.S. Cl.
CPC .......... *H04L 1/0003* (2013.01); *H04L 1/0026* (2013.01); *H04L 1/0027* (2013.01); *H04L 1/0009* (2013.01)

(58) Field of Classification Search
None
See application file for complete search history.

(56) References Cited

U.S. PATENT DOCUMENTS

2005/0113099 A1* 5/2005 Eriksson ............. H04W 72/005
455/450
2007/0133478 A1 6/2007 Armbruster et al.
(Continued)

FOREIGN PATENT DOCUMENTS

CN 1883223 A 12/2006
CN 101242566 A 8/2008
(Continued)

OTHER PUBLICATIONS

Optimization of Coverage and Throughput in Single-cell eMBMS; Li Zhang et al. ; School of Information and Communication Engineering beijing, China et al.; 2009 IEEE.

*Primary Examiner* — Christopher Crutchfield
*Assistant Examiner* — Tito Pham
(74) *Attorney, Agent, or Firm* — Ling Wu; Stephen Yang; Ling and Yang Intellectual Property

(57) ABSTRACT a method and system for managing a modulation and coding scheme (MCS). The method includes: a base station obtaining a downlink channel quality indicator (CQI) when a block error ratio of a trunking terminal reaches a pre-stored block error ratio threshold; the base station comparing a current CQI of a group with a CQI locally stored and reported by the group, wherein the CQI reported by the group is the minimum value in received CQIs reported by trunking terminals in the group respectively; and if a comparison result is that the CQI reported by the group is smaller than the current CQI of the group, the base station initiating an operation of updating an MCS value.

8 Claims, 3 Drawing Sheets

(56) References Cited

U.S. PATENT DOCUMENTS

| | | | |
|---|---|---|---|
| 2009/0323541 A1* | 12/2009 | Sagfors | H04L 1/0015 370/252 |
| 2010/0265862 A1* | 10/2010 | Choi | H04W 52/143 370/311 |
| 2011/0271162 A1 | 11/2011 | Jitsukawa et al. | |
| 2013/0095748 A1* | 4/2013 | Hu | H04L 1/0003 455/8 |

FOREIGN PATENT DOCUMENTS

| | | |
|---|---|---|
| CN | 101651957 A | 2/2010 |
| CN | 102271389 A | 12/2011 |
| CN | 102377508 A | 3/2012 |
| CN | 103078704 A | 5/2013 |
| EP | 2413514 A1 | 2/2012 |
| JP | 2010502108 A | 1/2010 |
| WO | 2011032274 A1 | 3/2011 |

\* cited by examiner

METHOD AND SYSTEM FOR MANAGING MODULATION AND CODING SCHEME

TECHNICAL FIELD

The present document relates to a mobile communication system, and more particularly, to a method and system for managing modulation and coding scheme (MCS).

BACKGROUND OF THE RELATED ART

The most basic services provided by a digital trunking communication system comprise group call service and broadcasting service. The group call service allows a trunking user terminal establishing a group call to a certain group of trunking user terminals belonging to a given area, and with the half-duplex mode, all the trunking user terminals within the group in a same cell share one downlink and pre-empt the uplink; only the calling party in the broadcasting call service can speak, the others are listeners, and if the calling party exits the call, the broadcasting call terminates. The common feature of these two services is: users having no speaking right in the group call have no Radio Resource Control (RRC) connections, no dedicated channels, and jointly monitor the group downlink broadcast channel; a user having/not having the speaking right in a single call and the user having the speaking right in the group call are based on the RRC connection, have dedicated channels, and are similar to general Long Term Evolution (LTE) users.

Because of the time-varying performance of the wireless channel, the traditional LTE technology uses the Adaptive Modulation Coding (AMC) mode to make the system adaptively tracking the link change by dynamically changing the coding scheme and modulation order: when the channel condition is relatively good, a relatively high order MCS will be used for data transmission to improve the system throughput; when the channel condition is relatively poor, a relatively low order modulation and coding scheme will be used for data transmission to ensure transmission reliability. The method of a traditional LTE implementing adaptive modulation and coding is: the terminal measuring the downlink channel quality to obtain a downlink signal to interference plus noise ratio (SINR) value, the terminal queries the SINR and CQI mapping table to obtain a downlink channel quality indicator (CQI), and uses the uplink PUCCH (Physical Uplink Control Channel) or PUSCH (Physical Uplink Shared Channel) to report the obtained CQI to the base station, the base station queries the CQI and MCS mapping table to obtain an MCS inner-ring value according to the reported CQI; the base station calculates a Block Error Ratio (BLER) in accordance with a downlink hybrid automatic repeat request (HARQ) result reported by the terminal, and then calculates the MCS outer-ring value through the sampling value of the BLER.

A digital trunking communication system based on conventional LTE technology achieves the traditional trunking service. Since the conventional LTE technology is designed for point-to-point communication services, while the trunking service is a point-to-multipoint service, the trunking service characteristics determine that the MCS used in the trunking data transmission is also different from that used in the general LTE technology, and the performance is as follows:

the downlink data transmission of a trunking user does not have HARQ feedback, so that the base station cannot be informed the packet error rate of the terminal and cannot obtain the MCS outer-ring value; users having no speaking right in the trunking do not have uplink channels, thus the users cannot use the process of a general LTE user reporting the CQI; the group users are separated, the distribution is relatively random and must ensure that each user in the group can reliably demodulate the encoded information; each end-user in the group will report the CQI, and the base station must reasonably process the CQI information reported by a plurality of terminals in the group.

These characteristics determine that the modulation and coding method used in the current LTE is not applicable to a digital trunking communication system based on the LTE technology.

SUMMARY

The embodiment of the present document provides a method and system for managing a modulation and coding scheme, to provide a solution for managing modulation and coding scheme in a digital trunking communication system based on the LTE technology.

The embodiment of the present document provides a method for managing a modulation and coding scheme (MCS), comprising:

a base station obtaining a downlink channel quality indicator (CQI) when a block error ratio of a trunking terminal reaches a pre-stored block error ratio threshold;

the base station comparing a current CQI of a group with a locally stored CQI reported by the group, wherein the CQI reported by the group is a minimum in received CQIs reported by trunking terminals in the group respectively; and if a comparison result is that the CQI reported by the group is smaller than the current CQI of the group, the base station initiating an operation of updating an MCS value.

The method further has the following feature: the method further comprises:

the trunking terminal starting a timer for prohibiting reporting when the local block error ratio reaches the pre-stored block error ratio threshold and the CQI is reported, to prohibit further sending CQI information to the base station again before the timer expires; and when the timer for prohibiting reporting expires, if the local block error ratio is still larger than the block error ratio threshold, the trunking terminal continuing to send the CQI information to the base station.

The method further has the following feature: the base station initiating an operation of updating the MCS value comprises:

updating the current CQI of the group to the CQI reported by the group; and querying a pre-stored group CQI and MCS mapping table to obtain a value corresponding to the current CQI of the group, and using the obtained value as an MCS inner-ring value.

The method further has the following feature: the base station initiating an operation of updating the MCS comprises:

if an MCS reported by the group is smaller than or equal to the group MCS, decreasing a group MCS outer ring value of the base station by one order, wherein the MCS reported by the group is a minimum of the MCSs corresponding to the CQIs reported when the block error ratio of the trunking terminal reaches the pre-stored block error ratio threshold, the group MCS is an MCS determined during a previous scheduling;

if a counter for group outer-ring scheduling reaches a preset threshold of a counter for MCS outer-ring scheduling, the base station increasing the group MCS outer-ring value by one order, and clearing the counter for group outer ring scheduling; wherein, when the MCS corresponding to the updated CQI reported by the group in the pre-stored group CQI and MCS mapping table is smaller than the group MCS, or, when the MCS reported by the group is smaller than or equal to the group MCS, the counter for group outer-ring scheduling is cleared; every time the base station periodically schedules the MCS value, the counter for group outer-ring scheduling is increased by one; and according to an adjusted MCS outer-ring value, the base station determining the MCS value of the scheduling of this time.

The method further has the following feature: the MCS value corresponding to the CQI reported when the block error ratio of the trunking terminal reaches the pre-stored block error ratio threshold is transmitted together with the CQI reported by the trunking terminal.

The embodiment of the present document further provides a system for managing a modulation and coding scheme (MCS), comprising a base station, wherein the base station comprises:

an obtaining device, configured to obtain a downlink channel quality indicator (CQI) when a block error ratio of a trunking terminal reaches a pre-stored block error ratio threshold;

a comparing device, configured to: connect with the obtaining device, compare a current CQI of a group with a locally stored CQI reported by the group, wherein the CQI reported by the group is a minimum in received CQIs reported by trunking terminals in the group respectively; and an updating device, configured to: connect to the comparing device, and initiate an operation of updating an MCS value if a comparison result is that the CQI reported by the group is smaller than the current CQI of the group.

The system further has the following feature: the system further comprises a trunking terminal, wherein the trunking terminal comprises:

a starting device, which is configured to: when the local block error ratio reaches the pre-stored block error ratio threshold and a CQI is reported, start a timer for prohibiting reporting to prohibit further sending the CQI information to the base station again before the timer expires;

a controlling device, configured to: connect with the starting device, and continue to send the CQI information to the base station when the timer for prohibiting reporting expires and if the local block error ratio is still larger than the block error ratio threshold.

The system further has the following feature: the updating device comprises:

an updating module, which is configured to: update the current CQI of the group to the CQI reported by the group; and a first determining module, configured to: query a pre-stored group CQI and MCS mapping table to obtain a value corresponding to the current CQI of the group, and use the obtained value as an MCS inner-ring value.

The system further has the following feature: the updating device comprises:

a controlling module, which is configured to: if an MCS reported by the group is smaller than or equal to the group MCS, decrease a group MCS outer ring value by one order, wherein the MCS reported by the group is a minimum of the MCSs corresponding to the CQIs reported when the block error ratio of the trunking terminal reaches the pre-stored block error ratio threshold, the group MCS is an MCS determined during a previous scheduling; and, if a counter for group outer-ring scheduling reaches a preset threshold of a counter for MCS outer-ring scheduling, increase the group MCS outer-ring value by one order, and clear the counter for group outer ring scheduling; wherein, when the MCS corresponding to the updated CQI reported by the group in the pre-stored group CQI and MCS mapping table and is smaller than the group MCS, or, when the MCS reported by the group is smaller than or equal to the group MCS, clear the counter for group outer-ring scheduling; every time the base station periodically schedules the MCS value, increase the counter for group outer-ring scheduling by one; and a second determining module, which is configured to: connect to the controlling module, and determine the MCS value of the scheduling of this time according to an adjusted MCS outer-ring value.

The system further has the following feature: the MCS value corresponding to the CQI reported when the block error ratio of the trunking terminal reaches the pre-stored block error ratio threshold is transmitted together with the CQI reported by the trunking terminal.

The method and system provided in the embodiment of the present document, on the basis of the LTE wireless protocol, propose a trunking system adaptive modulation and coding scheme based on the LTE technology for the digital trunking system, which can dynamically and adaptively adjust the modulation and coding scheme used in the group data transmission to ensure a reliable and effective transmission of trunking service data, and further improve the system capacity.

PREFERRED EMBODIMENTS OF THE INVENTION

Hereinafter, in conjunction with the accompanying drawings, the embodiments of the present document will be described in detail. It should be noted that, in the case of no conflict, embodiments and features in the embodiments of the present application may be arbitrarily combined with each other.

Figure 1:
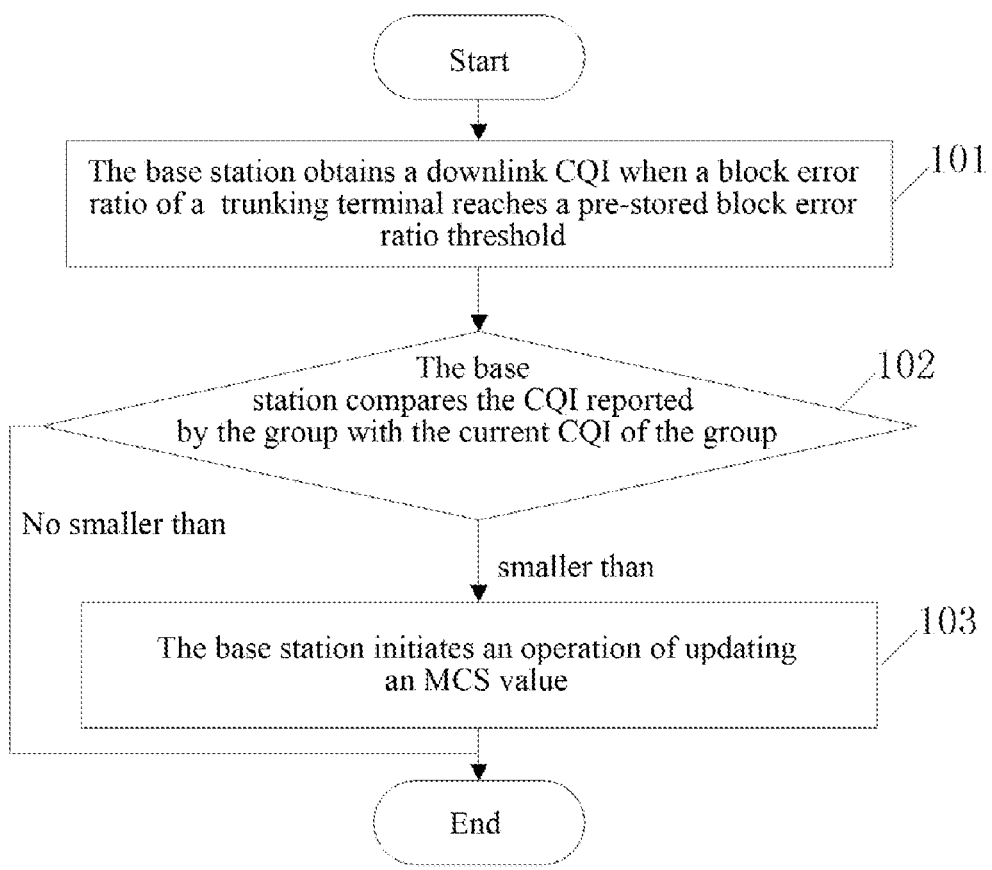
FIG. 1 is a schematic diagram of a method for managing modulation and coding scheme provided in an embodiment of the present document.

FIG. 1 is a schematic diagram of the method for managing modulation and coding scheme provided in an embodiment of the present document. As shown in FIG. 1, the method comprises the following steps:

in step 101, the base station obtains a downlink CQI when a block error ratio of a trunking terminal reaches a pre-stored block error ratio threshold;

in step 102, the base station compares the received CQI with the locally stored CQI reported by the group, wherein the CQI reported by the group is the minimum one in the received CQIs reported by trunking terminals in the group respectively.

In step 103, if the comparison result is that the CQI reported by the group is smaller than a current CQI of the group, the base station initiates an operation of updating an MCS value.

In the method provided in the embodiment of the present document, for the digital trunking system and based on the LTE wireless protocol, a trunking system adaptive modulation and coding scheme based on the LTE technology is proposed, which can dynamically and adaptively adjust the modulation and coding scheme used in the group data transmission to ensure a reliable and effective transmission of trunking service data, and further improve the system capacity.

Manages parameters are configured through the Operation Maintenance Center (OMC), such as a BLER threshold of reporting the CQI state report, a period of a timer for avoiding frequently triggering the CQI reporting, a threshold of a counter for MCS outer-ring scheduling, as well as a group initial CQI, and other parameters, and the parameters of the BLER threshold and the period of the timer for avoiding frequently triggering the CQI reporting are then sent to trunking terminals through a group bearer control message; after receiving the abovementioned parameters, a trunking terminal detects its own BLER in real time, when the BLER reaches a predetermined threshold, the trunking terminal reports the CQI and MCS which correspond to the BLER through a state report; the base station receives the CQI and MCS reported by the trunking terminal, and determines the MCS inner ring value according to the reported CQI when the group is scheduled, determines the MCS outer ring value according to the reported CQI and MCS when the group is scheduled, and further determines the final group MCS for scheduling according to the MCS inner ring value and the MCS outer ring value.

In order to effectively control the frequency of the trunking terminal reporting the CQI, the method further comprises:

the trunking terminal starting a timer for prohibiting reporting when the local block error ratio reaches a pre-stored block error ratio threshold and a CQI is reported, to prohibit the trunking terminal from further sending CQI information to the base station before the timer expires; as well as when the timer for prohibiting reporting expires, if the local block error ratio is still larger than the block error ratio threshold, the trunking terminal continues to send CQI information to the base station.

Wherein, the base station initiates the operation of updating the MCS value comprises:

updating the current CQI of the group to the CQI reported by the group; and querying a pre-stored group CQI and MCS mapping table to obtain a value corresponding to the current CQI of the group, and using the obtained value as the MCS inner-ring value.

How to determine the MCS inner ring value has been described above, those skilled in the art can determine the MCS outer ring value through other methods to finally obtain the MCS value. Hereinafter, a method for determining the MCS outer ring value is provided, and the method is described as follows.

Wherein, the base station initiates the operation of updating the MCS comprises:

if the MCS reported by the group is smaller than or equal to the group MCS, the base station decreases the group MCS outer ring value by one order, wherein, the MCS reported by the group is the minimum value of the MCSs corresponding to the CQIs reported when the block error ratio of the trunking terminal reaches the pre-stored block error ratio threshold, and the group MCS is the MCS determined at a previous scheduling of the group;

if a counter for group outer-ring scheduling reaches the preset threshold of the counter for MCS outer-ring scheduling, the base station increases the group MCS outer-ring value by one order, and clears the counter for group outer ring scheduling; wherein, when the MCS corresponding to the updated CQI reported by group in the pre-stored group CQI and MCS mapping table and is smaller than the group MCS, or, when the MCS reported by the group is smaller than or equal to the group MCS, the counter for group outer-ring scheduling is cleared; the counter for group outer-ring scheduling is increased by one every time the base station periodically schedules the MCS value; and according to the adjusted MCS outer-ring value, the MCS value of the scheduling is determined.

Similarly, how to determine the MCS outer ring value has been described above, those skilled in the art can determine the MCS inner ring value through other methods, of course, the method for obtaining the MCS inner ring value provided in the above can also be used to further obtain the MCS value.

To simplify the process procedure of the trunking terminal, the MCS value corresponding to the CQI reported when the block error ratio of the trunking terminal reaches the pre-stored block error ratio threshold is transmitted together with the CQI reported by the trunking terminal.

Hereinafter, the method provided in the embodiment of the present document will be described in detail.

Figure 2:
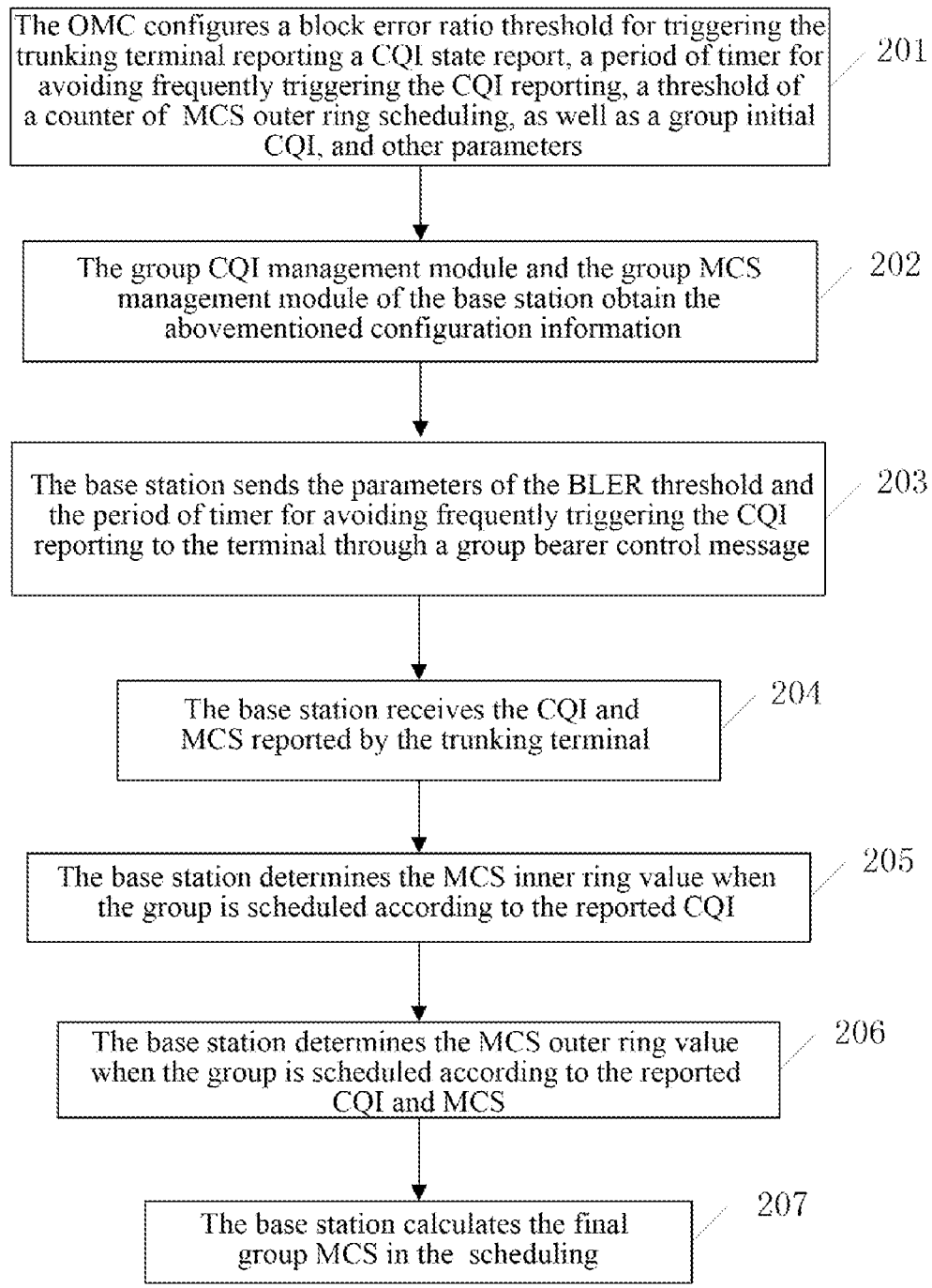
FIG. 2 is a schematic diagram of the method for managing modulation and coding scheme provided in an application example of the present document.

FIG. 2 is a schematic diagram of the method for managing modulation and coding scheme provided in an application example of the present document. As shown in FIG. 2, the method comprises the following steps 201 to 207:

in step 201, the OMC configures a BLER threshold for triggering the trunking terminal reporting a CQI state report, a period of a timer for avoiding frequently triggering the CQI reporting, a threshold of a counter for MCS outer ring scheduling, as well as a group initial CQI, and other parameters.

1). The OMC configures the BLER threshold for triggering the trunking terminal reporting the CQI state report, the period of the timer for avoiding frequently triggering the CQI reporting, the threshold of the counter for MCS outer ring scheduling, as well as the group initial CQI, and other parameters;

2). the group CQI management module and the group MCS management module of the base station obtain the abovementioned configuration information.

In step 202, the base station sends the parameters of the BLER threshold and the period of the timer for avoiding frequently triggering the CQI reporting to the trunking terminal through a group bearer control message.

1). The base station encodes the parameters of the BLER threshold and the period of the timer for avoiding frequently triggering the CQI reporting to the group bearer control message;

2). the base station periodically sends the group bearer control message to ensure the correct reception of terminals of the group accessed afterwards;

3). the trunking terminal receives the group bearer control message, and obtains the parameters of the BLER threshold and the period of the timer for avoiding frequently triggering the CQI reporting.

In step 203, the trunking terminal detects its own BLER in real time, and when the BLER reaches a predetermined threshold, the trunking terminal reports the CQI and MCS which correspond to the BLER through the state report.

The trunking terminal receives group data and monitors the BLER in real time;

if the monitored BLER exceeds the threshold, the trunking terminal reports the state report through a random access process, and the state report comprises the CQI and MCS which correspond to the BLER;

In order to avoid the trunking terminal frequently reporting its own state, the trunking terminals also needs to meet the CQI reporting interval protection at the same time of meeting the BLER triggering. After reporting the CQI for one time, the timer which is used to prohibit reporting is started, and the period of the timer is the parameter of the period of the timer for avoiding frequently triggering the CQI reporting, which is transmitted to the terminal through the bearer control message, and the CQI reporting cannot be further performed before the timer expires.

In step 204, the base station receives the CQI and MCS reported by the trunking terminal.

The base station demodulates the randomly accessed MSG3 (the third message) to obtain the reported CQI and MCS, and sends the reported CQI and MCS to the group CQI management module;

the group CQI management module comprises four attributes: group CQI, CQI reported by the group, group MCS, and MCS reported by the group, wherein:

the group CQI attribute is used to calculate the MCS inner ring value when the group is scheduled, the initial value of the group CQI is determined by the group initial CQI parameter in step 201; the group MCS saves the MCS determined when the group is scheduled at a previous time; the CQI reported by the group saves the minimum one of the CQIs reported by terminals in the group respectively and works as a group CQI candidate in the subsequent calculating of the group MCS; the MCS reported by the group saves the minimum value of the MCSs reported by terminals in the group respectively, which is used for subsequent calculating of the group MCS outer ring value;

the group CQI management module receives the reported CQI and/or MCS to judge whether it is smaller than the CQI and/or MCS reported by the group or not, if it is smaller, updates the CQI and/or MCS reported by the group, if it is larger, discards and does not process it.

In step 205, the base station determines the MCS inner ring value according to the reported CQI when the group is scheduled.

The method for determining the group CQI when the group is scheduled is:

the group MCS management module querying the group CQI and MCS mapping table to obtain the group MCS inner ring value according to the group CQI output by the group CQI management module.

In step 206, the base station determines the MCS outer ring value when the group is scheduled according to the reported CQI and MCS.

The initial value of the group MCS outer ring is determined through the group initial MCS outer ring value, and the update of the outer ring value is performed according to the following steps:

in step a, the group CQI management module queries the group CQI and MCS mapping table to obtain an MCS according to the CQI reported by the group, and clears the counter for group outer ring scheduling if the MCS is less than the group MCS.

In step b, the group MCS management module judges the MCS reported by the group which is output by the group CQI management module, if the MCS reported by the group is smaller than or equal to the group MCS, decreases the group MCS outer ring value by one order, that is, the value minus one.

In step c, every time the base station periodically schedules the MCS value, the counter for group outer ring scheduling is increased by one, the group MCS management module judges whether the counter for group outer ring scheduling reaches the threshold of the counter for MCS outer ring scheduling or not, and if yes, increases the group MCS outer ring value by one order, and clears the counter for group outer ring scheduling; if not, the group MCS outer ring value does not change.

In step 207, the base station finally calculates the group MCS in the scheduling.

The group MCS management module determines the final MCS when the group is scheduled, that is, the sum of the group MCS inner ring value and the MCS outer ring value;

The group MCS management module outputs the group MCS to the downlink data scheduling module.

In the embodiment of the present document, the trunking service characteristics and the LTE wireless protocol are considered comprehensively to propose a method for determining the trunking system modulation and coding scheme based on the long-term evolution technology, which ensures a reliable and effective transmission of the trunking service data, thereby increases the system capacity.

Figure 3:
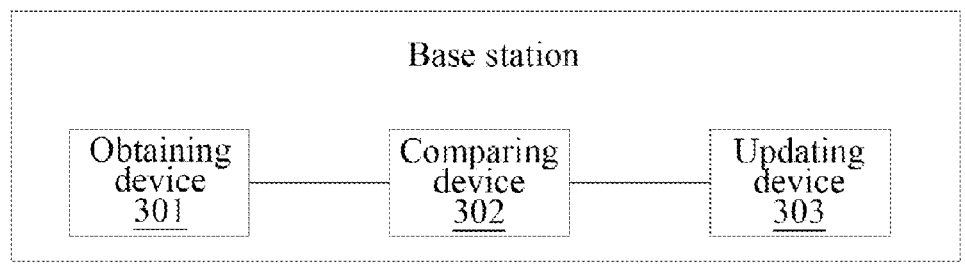
FIG. 3 is a block diagram of a system for managing modulation and coding scheme provided in an embodiment of the present document.

FIG. 3 is a schematic diagram of the system for managing modulation and coding scheme provided in an embodiment of the present document. As shown in FIG. 3, the system comprises base station 30, wherein the base station 30 comprises:

an obtaining device 301, which is used to obtain the downlink CQI when the block error ratio of the trunking terminal reaches a pre-stored block error ratio threshold;

a comparing device 302, connected to the obtaining device, and used to compare a current CQI of the group with a locally stored CQI reported by the group, wherein the CQI reported by the group is the minimum value in the received CQIs reported by trunking terminals in the group respectively; and an updating device 303, which is connected with the comparing device 302, if the comparison result is that the CQI reported by the group is smaller than the current CQI of the group, initiate an operation of updating an MCS value.

Wherein, the system further comprises trunking terminal 31, wherein the trunking terminal 31 comprises:

a starting device 311, which is used to: when the local block error ratio reaches a pre-stored BLER threshold and the CQI is reported, start a timer for prohibiting reporting to prohibit further sending the CQI information to the base station before the timer expires;

a controlling device 312, which is connected with the starting device 311, and used to, when the timer for prohibiting reporting expires, if the local block error ratio is still larger than the block error ratio threshold, continue to send the CQI information to the base station.

Wherein: the updating device 303 comprises:

an updating module 3031, which is used to update the current CQI of the group to the CQI reported by the group; and a first determining module 3032, which is used to query the pre-stored group CQI and MCS mapping table to obtain a value corresponding to the current CQI of the group, and use the obtained value as the MCS inner-ring value.

Wherein: the updating device 303 comprises:

a controlling module 3033, which is used to: if the MCS reported by the group is smaller than or equal to the group MCS, decrease the group MCS outer ring value by one order, wherein the MCS reported by the group is the minimum value in the MCSs corresponding to the CQIs reported when the block error ratio of the trunking terminal reaches the pre-stored block error ratio threshold, the group MCS is the MCS determined at previous scheduling of the group; and, if the counter for group outer-ring scheduling reaches the preset threshold of the counter for MCS outer-ring scheduling, then decrease the group MCS outer-ring value by one order, and clear the counter for group outer ring scheduling; wherein, when the MCS corresponding to the updated CQI reported by the group in the pre-stored group CQI and MCS mapping table is smaller than the group MCS, or, when the MCS reported by the group is smaller than or equal to the group MCS, clear the counter for group outer-ring scheduling; every time the base station periodically schedules the MCS value, increase the counter for group outer-ring scheduling by one;

a second determining module 3034, which is connected with the controlling module 3033 and used to determine the MCS value of the scheduling according to the adjusted MCS outer ring value.

Wherein, the MCS value corresponding to the CQI reported when the block error ratio of the trunking terminal reaches the pre-stored block error ratio threshold is transmitted together with the CQI reported by the trunking terminal.

In the system provided in the embodiment of the present document, the trunking service characteristics and the LTE wireless protocol are considered comprehensively to propose a method for determining the trunking system modulation and coding scheme based on the long-term evolution technology, which ensures a reliable and effective transmission of the trunking service data, thereby increases the system capacity.

Those of ordinary skill in the art can understand that all or some steps of the abovementioned embodiment may be implemented with computer program procedures, and the computer program may be stored in a computer-readable storage medium, and the computer program is implemented on an appropriate hardware platform (such as, a system, a device, an apparatus, a component, and so on), and the implementation comprises a step in the method embodiment or a combination thereof.

Alternatively, all or some steps of the abovementioned embodiment can also be implemented with integrated circuits, these steps may be made into individual integrated circuit modules respectively, or a plurality of modules of steps therein are made into a single integrated circuit module to be implemented. Thus, the embodiment of the present document is not limited to any specific combination of hardware and software.

Each devices/functional modules/functional units in the abovementioned embodiment can be implemented with universal computing devices, they can be concentrated on a single computing device, or distributed over a network composed of a plurality of computing devices.

When the each devices/functional modules/functional units in the abovementioned embodiment are implemented in the form of software functional modules and sold or used as a standalone product, they can be stored in a computer readable storage medium. The abovementioned computer-readable storage medium may be a read-only memory, magnetic or optical disk and the like.

The above description is only embodiments of the present document, but the protection scope of the present document is not limited to this, any person skilled in the art can easily think of changes or replacements in the technical scope disclosed in the embodiments of the present document, and these changes and replacements should fall within the protection scope of the present document. Accordingly, the protection scope of the present document should be the protection scope of the claims.

INDUSTRIAL APPLICABILITY

The method and system provided in the embodiment of the present document can be used to dynamically and adaptively adjust the modulation and coding scheme used in the group data transmission to ensure a reliable and effective transmission of trunking service data, and further improve the system capacity.

What is claimed is:

1. A method for managing a modulation and coding scheme (MCS), comprising:
    a base station obtaining a downlink channel quality indicator (CQI) and a MCS reported by a trunking terminal when a block error ratio of the trunking terminal reaches a pre-stored block error ratio threshold;
    the base station comparing a current CQI of a group with a locally stored CQI reported by the group, wherein the CQI reported by the group is a minimum in received CQIs reported by trunking terminals in the group respectively; and
    if a comparison result is that the CQI reported by the group is smaller than the current CQI of the group, the base station initiating an operation of updating an MCS value;
    wherein, the base station initiating an operation of updating the MCS comprises:
    when an MCS reported by the group is smaller than or equal to a group MCS, decreasing a group MCS outer ring value of the base station by one order, wherein the MCS reported by the group is a minimum of the MCSs corresponding to the CQIs reported by the trunking terminals when the block error ratios of the trunking terminals reach the pre-stored block error ratio threshold, the group MCS is an MCS determined during a previous scheduling;
    when a counter for group outer-ring scheduling reaches a preset threshold of a counter for MCS outer-ring scheduling, the base station increasing the group MCS outer-ring value by one order, and clearing the counter for group outer ring scheduling; wherein, when the MCS corresponding to an updated CQI reported by the group in a pre-stored group CQI and MCS mapping table is smaller than the group MCS, or, when the MCS reported by the group is smaller than or equal to the group MCS, the counter for group outer-ring scheduling is cleared; every time the base station periodically schedules the MCS value, the counter for group outer-ring scheduling is increased by one; and
    according to an adjusted MCS outer-ring value, the base station determining the MCS value of the scheduling of this time.

2. The method of claim 1, further comprising:
    the trunking terminal starting a timer for prohibiting reporting when the local block error ratio reaches the pre-stored block error ratio threshold and a CQI is reported, to prohibit further sending CQI information to the base station before the timer expires; and
    when the timer for prohibiting reporting expires, if the local block error ratio is still larger than the block error ratio threshold, the trunking terminal continuing to send the CQI information to the base station.

3. The method of claim 1, wherein, the base station initiating an operation of updating the MCS value comprises:
updating a current CQI of the group to a CQI reported by the group; and
querying the pre-stored group CQI and MCS mapping table to obtain a value corresponding to the current CQI of the group, and using the obtained value as an MCS inner-ring value.

4. The method of claim 1, wherein, the MCS value corresponding to the CQI reported by the trunking terminal when the block error ratio of the trunking terminal reaches the pre-stored block error ratio threshold is transmitted together with the CQI reported by the trunking terminal.

5. A system for managing a modulation and coding scheme (MCS), comprising a base station, wherein the base station comprises: an obtaining processor, a comparing processor, an updating processor and a non-transitory storage medium storing computer programs that when executed cause the processors to perform following corresponding steps:
the obtaining processor obtaining a downlink channel quality indicator (CQI) and a MCS reported by a trunking terminal when a block error ratio of the trunking terminal reaches a pre-stored block error ratio threshold;
the comparing processor, which is configured to connect with the obtaining processor, comparing a current CQI of a group with a locally stored CQI reported by the group, wherein the CQI reported by the group is a minimum in received CQIs reported by trunking terminals in the group respectively; and
the updating processor, which is configured to connect to the comparing processor, initiating an operation of updating an MCS value if a comparison result is that the CQI reported by the group is smaller than the current CQI of the group;
wherein, the updating processor further comprises:
a controlling circuit, which is configured to: when an MCS reported by the group is smaller than or equal to the group MCS, decrease a group MCS outer ring value by one order, wherein the MCS reported by the group is a minimum of the MCSs corresponding to the CQIs reported by the trunking terminals when the block error ratios of the trunking terminals reach the pre-stored block error ratio threshold, the group MCS is an MCS determined during a previous scheduling; and,
when a counter for group outer-ring scheduling reaches a preset threshold of a counter for MCS outer-ring scheduling, increase the group MCS outer-ring value by one order, and clear the counter for group outer ring scheduling; wherein, when the MCS corresponding to an updated CQI reported by the group in a pre-stored group CQI and MCS mapping table is smaller than the group MCS, or, when the MCS reported by the group is smaller than or equal to the group MCS, clear the counter for group outer-ring scheduling; and every time the base station periodically schedules the MCS value, increase the counter for group outer-ring scheduling by one; and
a second determining circuit, which is configured to: connect to the controlling circuit, and determine the MCS value of the scheduling of this time according to an adjusted MCS outer-ring value.

6. The system of claim 5, further comprising a trunking terminal, wherein the trunking terminal comprises: a starting processor, a controlling processor, and a non-transitory storage medium storing computer programs that when executed cause the processors to perform following corresponding steps:
the starting processor: when the local block error ratio reaches the pre-stored block error ratio threshold and a CQI is reported, starting a timer for prohibiting reporting to prohibit further sending the CQI information to the base station before the timer expires;
the controlling processor, which is configured to connect with the starting processor, continuing to send the CQI information to the base station when the time for prohibiting reporting expires and if the local block error ratio is still larger than the block error ratio threshold.

7. The system of claim 5, wherein the updating processor comprises:
an updating circuit, which is configured to: update the current CQI of the group to the CQI reported by the group; and
a first determining circuit, configured to: query the pre-stored group CQI and MCS mapping table to obtain a value corresponding to the current CQI of the group, and use the obtained value as an MCS inner-ring value.

8. The system of claim 5, wherein the MCS value corresponding to the CQI reported by the trunking terminal when the block error ratio of the trunking terminal reaches the pre-stored block error ratio threshold is transmitted together with the CQI reported by the trunking terminal.

* * * * *